United States Patent [19]

Beam et al.

[11] 4,349,733
[45] Sep. 14, 1982

[54] SUN TRACKER

[75] Inventors: Benjamin H. Beam, Sunnyvale; Richard M. Beam, Los Altos, both of Calif.

[73] Assignee: Beam Engineering, Inc., Sunnyvale, Calif.

[21] Appl. No.: 165,564

[22] Filed: Jul. 3, 1980

[51] Int. Cl.³ .............................................. G01J 1/20
[52] U.S. Cl. ................................ 250/203 R; 126/425
[58] Field of Search ................... 250/203 R, 208, 209; 126/424, 425

[56] References Cited

U.S. PATENT DOCUMENTS

| | | | |
|---|---|---|---|
| 3,370,293 | 2/1968 | Green | 250/203 R |
| 3,996,917 | 12/1976 | Trihey | 126/425 |
| 4,027,651 | 6/1977 | Robbins | 126/425 |
| 4,135,493 | 1/1979 | Kennedy | 126/425 |
| 4,146,784 | 3/1979 | Yekutieli | 250/203 R |

*Primary Examiner*—David C. Nelms
*Attorney, Agent, or Firm*—Thomas H. Olson

[57] ABSTRACT

A sun tracker for use on a sun following device such as a concentrating solar collector. The sun tracker includes two spaced apart photosensitive elements which are separated by an opaque splitter plate so that when the splitter plate points directly at the sun the photosensitive devices are uniformly excited. The west facing surface of the splitter plate is reflective so that movement into alignment with the sun can be achieved even after long periods during which the sun is obscured by clouds. The outer edge of the splitter plate is arcuately formed so that excitation of the photocells is substantially independent of the angular orientation of the sun tracker.

9 Claims, 6 Drawing Figures

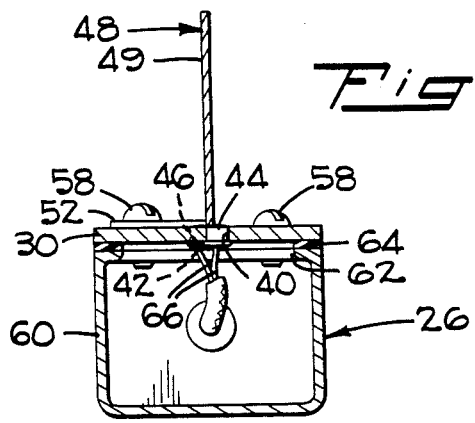
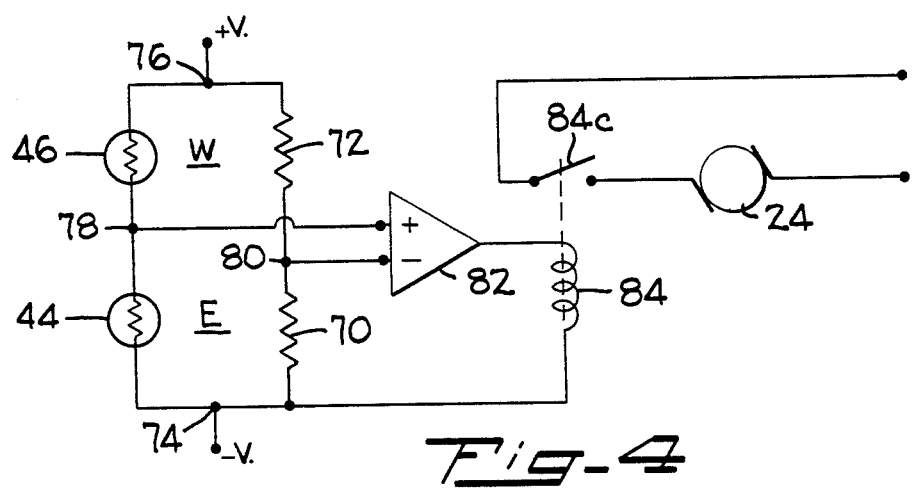
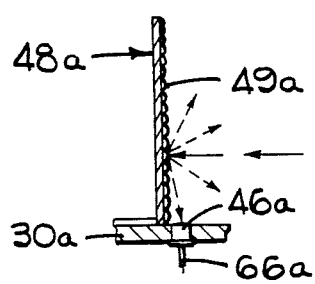
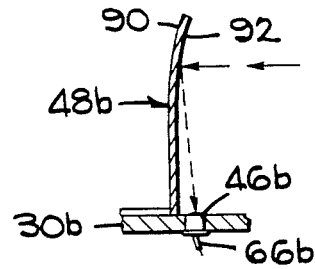

SUN TRACKER

BACKGROUND OF THE INVENTION

1. Field of the Invention

This invention relates to a sun tracker and more particularly to a tracker for sensing the position of a solar tracking device with respect to the sun in order to effect movement of the device as the sun moves.

2. Description of the Prior Art

Commonly owned U.S. Pat. No. 4,205,659 discloses a solar energy collector or concentrator having a paraboloid-shaped reflector, an elongate heat receiving member or pipe at the focus of the reflector and one or more photoelectric sensors in the bottom of the reflector. The photoelectric sensors are positioned such that when the sun moves westward of alignment with the paraboloid shaped reflector, the sensors are excited and actuate a motor to move the reflector into alignment with the sun. Although such device is effective during sunny or partially clouded days, it has limited ability to pick up the sun after the sun has been obscured by clouds for several hours because the location of the photoelectric sensors in the bottom of the reflector subjects the sensors to shading by the lateral walls of the reflector.

U.S. Pat. No. 4,153,039 discloses a photosensor which is located in the bottom of a trough shaped mirror which renders it incapable of picking up the sun when the sun is at a substantial angle from alignment with the mirror.

U.S. Pat. No. 4,068,653 discloses a solar heating unit having photocells which are mounted at the end of long tubes in order to shade them so that they will only respond to substantially direct light rays. Accordingly the photocells in the patented structure respond only to sunlight which is substantially aligned with the curved reflector.

U.S. Pat. No. 4,098,264 discloses a tracking solar collector wherein two photocells are mounted in the bottom of a cylindrical housing which has two compartments formed by an opaque wall extending diametrically within the housing. The sensor forms a collimator which responds to energy from the sun only if it is almost precisely aligned with the collector.

SUMMARY OF THE INVENTION

According to the present invention there are two photoelectric sensors that are mounted in spaced apart relation in a base. Between the sensors and extending upward from the base is an opaque plate which is oriented such that when the plate is pointing toward the sun, the sensors receive substantially equal illumination and when the plate is not pointed toward the sun one of the sensors is shaded by the opaque splitter plate. At least one surface of the plate is a reflective surface. In solar devices that are mounted for pivotal movement on a north-south axis, the base is installed such that the reflective surface faces westward. Thus, if the device is unable to track the sun because the sun is obscured by clouds for a substantial period of time, energy from the sun, when the clouds eventually no longer obscure it, is reflected by the reflective surface onto the photoelectric sensor disposed on the same side of the plate as the reflective surface so as to provide a signal which can be used to move the device into alignment with the sun.

Also contributing to improved tracking afforded by the invention is the presence on the outer edge of the splitter plate of an arcuate or convex shape. Such shape enhances uniformity of tracking accuracy and sensitivity throughout the year. The tracker is installed on a sun following device such that the highest point on the arcuate edge is within the 47° arc through which the sun moves in a north-south direction during the year. At such position the sun's rays are perpendicular to the base surface in which the photoelectric sensors are mounted at some time during the year. At other times during the year the sun will be aligned with the relatively lower portions of the curved edge; because such lower portions are at equal distances from the photoelectric sensors, the degree of excitation of the sensors is substantially uniform throughout the year.

An object of the invention is to provide a sun tracker capable of positioning a device with which it is used into alignment with the sun after long periods during which the sun is obscured by clouds. This object is achieved by providing a plate having a reflective surface so that even should the sun travel 90° or more while it is obscured by clouds, the sun's energy will be sensed by a sensor mounted in energy receiving relation to the reflective surface, when the sun is no longer obscured by clouds.

Another object of the invention is to provide a sun tracker capable of operation with substantially uniform sensitivity throughout the year. Achievement of this object is desirable because the angular position of the daily traverse of the sun varies with the time of the year; the convexly arcuate edge portion of the splitter plate functions to admit substantially constant levels of solar energy to the sensors at all times during the year.

The foregoing, together with other objects, features and advantages will be more apparent after referring to the following specification and the accompanying drawings.

BRIEF DESCRIPTION OF THE DRAWINGS

FIG. 3 is a sectional view taken along lines 3—3 of FIG. 1.

FIG. 4 is a simplified schematic diagram of a circuit useful with the sensor of FIGS. 1-3.

FIG. 5 is a view similar to FIG. 3 showing one modification of the invention.

FIG. 6 is a view similar to FIG. 3 showing another modification of the invention.

DETAIL DESCRIPTION OF THE PREFERRED EMBODIMENT

Figure 1:
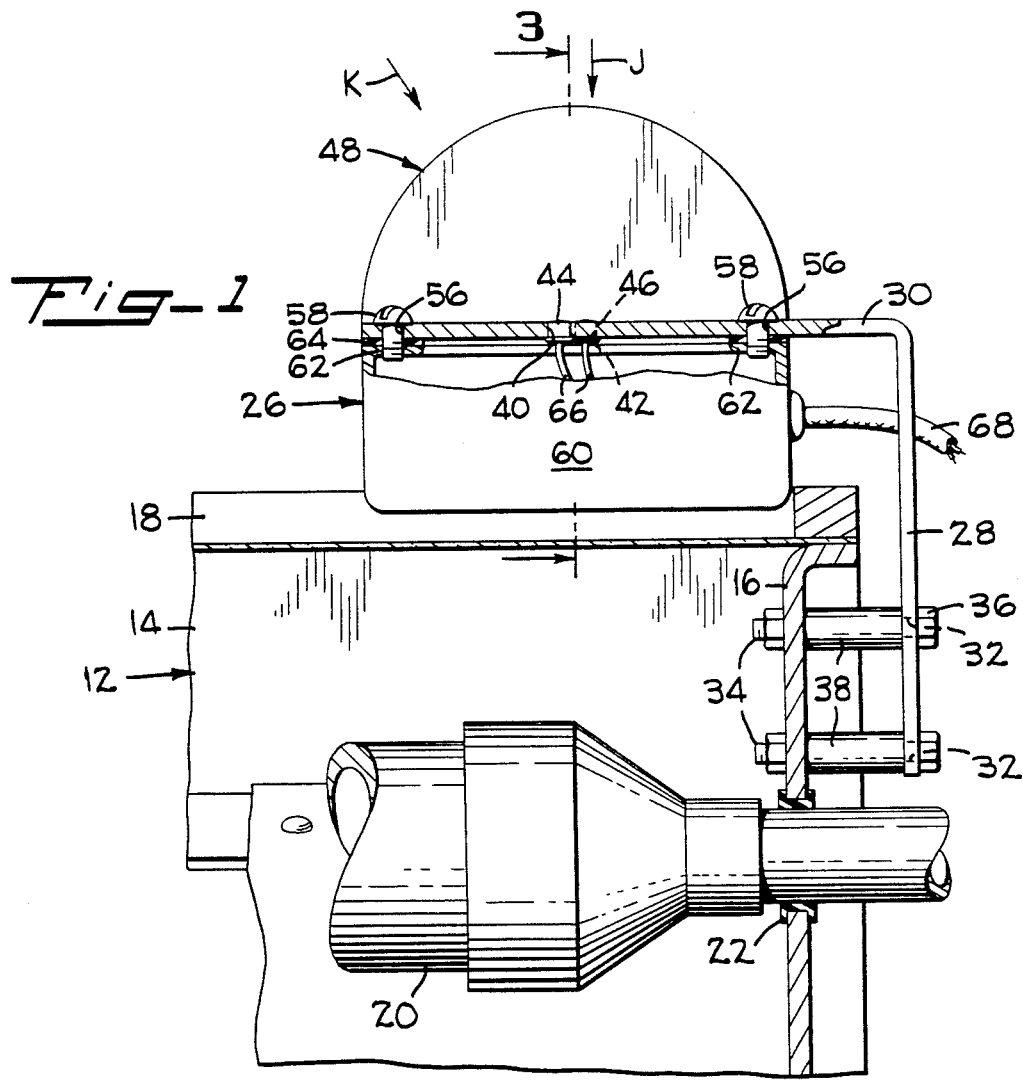
FIG. 1 is a side view of a sun tracker according to the invention mounted on a reflector or concentrator that is shown fragmentarily.

Referring more particularly to the drawings, reference numeral 12 indicates a fragment of a solar concentrator of the type shown in commonly assigned U.S. Pat. No. 4,205,659, the disclosure of which is incorporated hereinto by this reference. The concentrator includes a reflective panel 14 supported in a concave configuration by end plates, one of which is indicated at 16, and side rails, one of which is indicated at 18. At the focus of the curved reflective surface formed by panel 14 a pipe 20 is supported so that solar rays reflected by the surface of panel 14 are concentrated on the pipe so as to heat liquid flowing therein. As indicated in the above cited patent, pipe 20 is mounted rigidly and end plate 16 pivots on the pipe, a bushing 22 being provided to permit pivotal movement of the concentrator so that it can follow the sun in its east-west traverse of the sky. A motor 24 is linked to the concentrator by linkage, not shown in the drawings but fully disclosed in the above cited patent, to pivot the concentrator. A solar tracker generally indicated at 26 is provided to effect actuation of motor 24 in accordance with the relative position of the sun and the solar tracker. Solar tracker 26 is supported on end plate 16 by means of a bracket having a vertical leg 28 and a horizontal leg 30. Vertical leg 28 at its lower end is provided with four mounting holes 32 through which mounting bolts 34 extend. End plate 16 is provided with corresponding holes to receive the mounting bolts, and each mounting bolt is provided with a cylindrical spacer 38 so that vertical leg 28 is supported in upstanding relation with horizontal leg 30 clear of concentrator 12.

Horizontal plate 30 forms the base of the solar tracker and is provided with an east hole 40 and a west hole 42. An east photocell 44 is mounted in hole 40 and a west photocell 46 is mounted in hole 42. The photocells are secured within the respective holes by adhesive or other suitable expedient. The photocells are well known devices having an electrical characteristic that varies as a function of the magnitude of solar energy impinging on them. For example, the photocells can have a resistance which decreases with increasing illumination and which increases with decreasing illumination. Mounted on the upper surface of the base formed by horizontal plate 30 is a splitter plate 48 which, as seen in FIG. 1, has a semicircular shape. Splitter plate 48 is provided with two integral mounting tabs 50 and 52; each of the mounting tabs has an elongate slot 54 and plate 30 has mounting holes 56 aligned with the slots to receive mounting screws 58 therethrough. Elongate slots 54 permit splitter plate 48 to be positioned as seen in FIG. 2, wherein east photocell 44 is exposed on the east side of the splitter plate and west photocell 46 is exposed on the west side of the splitter plate.

In order to avoid excitation of the photocells by energy from the wrong side of the splitter plate, it is desirable in some cases to apply opaque cement to the portion of the photocell that underlies the splitter plate.

Figure 2:
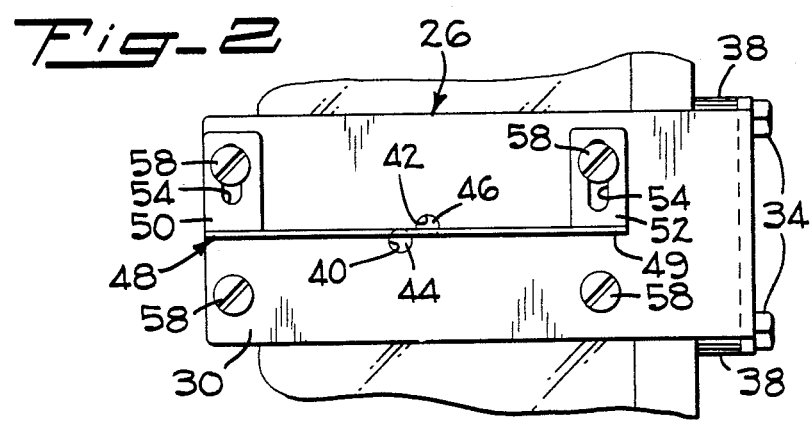
FIG. 2 is a top view of the sun tracker of FIG. 1.

As shown in FIG. 2, holes 40 and 42 overlap one another. Thus when splitter plate 48 is in place, only portions of photocells 44 and 46 are exposed on opposite sides of the splitter plate thereby effecting improved accuracy of tracking.

The outer edge of splitter plate 48, i.e., the edge remote from base plate 30, is radiused so as to be convexly arcuately shaped. In the embodiment of FIG. 1 the outer edge of the splitter plate is configured such that a point midway between photocells 44 and 46 is the center of the arc. The purpose of the arcuate edge can first be considered by assuming that the sun's rays impinge on the sensor in a direction identified by arrow J, which would represent the sun's relative position during a summer month. At some different time of the year the sun's rays will impinge on the sensor from a different direction such as indicated by the arrow K. Because the outer most edge of the splitter plate is equidistant to the photocells for both sun positions, and all positions in between, the photocells will receive substantially equal illumination throughout the year and therefore the sensitivity of the sensor will remain substantially the same throughout the year.

The west facing surface 49 of splitter plate 40 is reflective. Such characteristic results in the embodiment shown in FIGS. 1-3 by forming splitter plate 48 of aluminum having a clear anodized surface.

Mounted underneath horizontal plate 30 is a watertight box 60 which has an open top circumscribed by a flange 62. In the corners of flange 62 are formed holes which register with holes 56 so that screws 58 retain box 60 on the underside of plate 30. A gasket 64 is installed between flange 62 on the lower surface of plate 30 so as to form a substantially waterproof joint. The interior of waterproof box 60 can be filled with potting compound for further resistance against moisture.

The output leads of photocells 44 and 46, seen at 66 in FIG. 1, are connected through a waterproof sheath 68 to a motor control circuit shown in FIG. 4. Photocells 44 and 46 are connected in a bridge circuit with resistors 70 and 72. A common point 74 between east photocell 44 and resistor 70 constitutes the negative voltage input to the bridge. A common point 76 between west photocell 46 and resistor 72 constitutes the positive voltage input to the bridge. Circuit point 78, which is at the common connection between the two photocells 44 and 46, constitutes one output; circuit point 80, which is at the common connection between resistors 70 and 72, constitutes the other output. There is a differential amplifier 82 having a negative input connected to circuit point 80 and a positive input connected to circuit point 78. When the voltage at circuit point 78 exceeds the voltage at circuit point 80, differential amplifier 82 operates to produce an output. When the voltage at circuit point 80 exceeds the voltage at circuit point 78, or when the voltages are equal, the differential amplifier produces no output. The output of the differential amplifier is applied to a relay coil 84 which has associated with it a set of normally open contacts 84C. When coil 84 is energized, contacts 84C are closed. It will be noted that power to motor 24 is supplied through contacts 84C so that when coil 84 is energized, motor 24 is energized.

In the installation of the sensor as shown in FIG. 1, pipe 20 is oriented in a north-south direction. In the northern hemisphere the end of the structure seen in FIG. 1 is typically elevated above the opposite end, the particular angle being determined by the latitude at which the unit is installed. Sensor 26 is mounted so that photocell 40 is on the eastern side of splitter plate 48 and photocell 42 is on the western side of the splitter plate. At a given time of day when sensor 26 is oriented such that splitter plate 48 points directly toward the sun, the exposed portions of photocells 44 and 46 will be substantially equally illuminated such that their resistances will be substantially the same. In this condition the voltage at circuit point 78 will be equal to the voltage at circuit point 80 so that amplifier 82 produces no output and relay coil 84 is not energized. As the sun progresses toward the west, photocell 46 is subjected to greater illumination than photocell 44 so that the resistance of photocell 46 decreases and the voltage at circuit point 78 increases. Such condition applies a differential input to amplifier 78 which energizes relay coil 84 and closes relay contacts 84C. Motor 24 is thereby energized. When the motor moves concentrator 12 and sensor 26 to a position at which splitter 48 is pointing directly at the sun, the energy incident on photocells 44 and 46 will equalize and amplifier 82 will produce no output thus deenergizing motor 24. In this way the device tracks the sun so that maximum solar energy is always received by concentrator 12 and reflected to water pipe 20.

Should the sky become sufficiently cloudy that the level of excitation of photocell 46 is insufficient to cause amplifier 82 to produce an output, concentrator 12 and sensor 26 will not track the sun. If the time during which the sun is obscured by clouds is relatively short, then as soon as the sun illuminates photocell 46 the device will track as described immediately above. If, however, a number of hours elapse before clouds no longer obstruct the sun it could well be that when the clouds move away there will be a substantial angle between the direction of the sun's rays and the plane of splitter plate 48. The sun tracker embodying the invention will track in such condition, however, because the rays of the sun will be reflected from reflective surface 49 of the splitter plate onto photocell 46. Thus the presence of the reflective surface on the splitter plate enables the sensor to resume tracking the sun even though the sun has been obscured by clouds for a substantial period. More particularly, the sun can move to a position almost 90° from parallelism with splitter plate 48 and the sensor will still be activated when the sun is no longer obscured by clouds.

Virtually all commercially available photoelectric devices which are employed for photocells 44 and 46 have a finite angle of receptivity. Such photocells typically have maximum sensitivity to energy flowing on a path axially of the photocell and lesser sensitivity to energy on paths oblique of such axis. Because light entering anywhere within the angle of receptivity will effect the necessary electrical change within the photoelectric device, surface 30 need not in all cases be a plane surface so long as energy entering in a direction parallel to splitter plate 48 is within the angle of receptivity of both of the photocells.

The embodiments shown in FIGS. 5 and 6 are capable of resuming tracking after even a greater angle of sun movement while obscured. Referring first to FIG. 5, in which elements corresponding to those shown in FIGS. 1–4 are identified by the same reference numerals with the addition of an "a," there is a splitter plate 48a which has a diffusely reflecting surface 49a on the west facing side thereof. Such surface reflects light toward photocell 46a which is supported on a plate 30a. Because the balance of the structure of FIG. 5 is identical to that described hereinabove in connection with FIGS. 1–4, such structure is neither shown nor described. Surface 49a is composed of a plurality of reflective hemispheric convexities or like irregular reflective surface. Consequently, photocell 46a will be energized even though the sun occupies a position more than 90° from parallelism with splitter plate 48a. As indicated in the broken arrows, the sun is diffusely reflected by the hemispherical convexities even when the sun is displaced by more than 90° from the splitter plate so that energy is reflected onto photocell 46a. Excitation of photocell 46a will effect activation of the motor as previously described until splitter plate 48a is moved into a position pointing directly at the sun whereupon motor activation will cease.

Referring to FIG. 6, in which elements corresponding to those shown in FIGS. 1–4 are identified by the same reference numerals with the addition of a "b," there is a splitter plate 48b extending from a base plate 30b. In base plate 30b is mounted a photocell 46b. The upper end of the splitter plate, that is, the end remote from base plate 30b, has a curvilinear portion 90 which forms a concave reflective surface 92 on the side thereof corresponding to the location of photocell 46b (i.e., on the west facing side of the splitter plate). As indicated by the dashed arrows in FIG. 6, convex surface portion 92 affords excitation of photocell 46b even when the sun is disposed at a position more than 90° from the plane of the lower part of the splitter plate. Thus if the sun is at such angular position when it is no longer obscured by clouds, photocell 46b is excited and movement of the sensor and the equipment on which it is mounted proceeds until the sensor is positioned such that splitter plate 48b points toward the sun.

The foregoing description of the preferred embodiments of the invention has assumed that concentrator 12 is mounted on a north-south axis. Many concentrators, however, are located so that pipe 20 is oriented on an east-west axis. In such concentrators it is necessary to reposition the orientation of the concentrator only once per day to achieve optimum energy concentration on pipe 20. The sensors described above are useful in such installations. Circuitry now shown is provided for pivoting the concentrator and sensor 26 to a morning position that is the same throughout the year. In the morning position, in the case of a device utilized in the northern hemisphere, the device is oriented such that the reflective surface 49 of the splitter plate always points northerly of the position of the sun. Thus when the sun rises above the horizon photocell 46 will be excited and will pivot the concentrator about the east-west axis until the splitter plate points to the sun and photocells 44 and 46 are subjected to equal illumination. This condition will not change throughout the day. The arcuate configuration of the outer edge of the splitter plate will assure that throughout the day the degree of excitation to the photocells is substantially constant. In a system utilizing the sensors in this manner, additional sensing equipment (not shown) is employed to return the concentrator to the morning position after the sun has gone below the horizon and no longer illuminates either of the photocells.

Thus it will be seen that the present invention provides a sun sensor which affords accurate tracking of the sun and which, even after long periods of obscuration of the sun by clouds, can be moved to point toward the sun when it finally emerges from the clouds. The system is extremely simple and straightforward and is rugged thereby requiring little if any maintenance. Moreover, the sensor can be employed to advantage on collectors that are oriented both in a north-south direction and in an east-west direction.

Although several embodiments of the invention have been shown and described, it will be obvious that other adaptations and modifications can be made without departing from the true spirit and scope of the invention.

What is claimed is:

1. A sun tracker comprising a base, first and second photoelectric sensors mounted on said base in spaced apart relation, a substantially opaque plate mounted on said base between said sensors, said plate having first and second faces and a thickness between said faces sufficient to obscure partially said sensors and expose a portion of said first sensor outward of said first face and a portion of said second sensor outward of said second face, said plate extending outward of said base so that when said base is oriented such that said plate points toward the sun said sensors are substantially uniformly illuminated, said first face being a reflective face that confronts said first sensor so as to effect illumination of said first sensor when said base is oriented so that illumination from the sun impinges on the tracker from a direction between said reflective face and said base, and means responsive to a magnitude of illumination of said first sensor that is greater than the magnitude of illumination of said second sensor for moving said base toward a position at which said plate points toward the sun, said base moving means being deactivated when said sensors are substantially equally illuminated.

2. A sun tracker according to claim 1 wherein said base includes a planar surface, wherein said sensors are mounted in said surface and wherein said opaque plate extends from said surface substantially perpendicular thereto.

3. A sun tracker according to claim 1 wherein said reflective face includes a plurality of generally hemispherical convexities so as to diffuse sunlight impinging thereon.

4. A sun tracker according to claim 1 wherein a portion of said plate remote from said base has a curvilinear portion, said curvilinear portion being concave in the direction of said first sensor so that said reflective face has a corresponding concave portion.

5. A sun tracker according to claim 1 wherein said plate has an edge remote from said base, said edge being convexly arcuately formed to afford substantially uniform illumination of said sensors as the position of the sun varies in latitude.

6. A sun tracker according to claim 1 wherein said first sensor has an angle of receptivity and wherein said first sensor is mounted in said base at an angle corresponding to said angle of receptivity.

7. A sun tracker comprising a generally planar base, first and second photoelectric sensors mounted on said base in spaced apart relation, a substantially opaque plate mounted on said base between said sensors, said plate extending substantially perpendicularly outward of said base so that when said base is oriented such that said plate points toward the sun said sensors are substantially uniformly illuminated, said plate having a reflective face on the side thereof that confronts said first sensor so as to effect illumination of said first sensor when said base is oriented so that illumination from the sun impinges on the tracker from a direction between said plate and said base, said reflective face having a reflective surface portion spaced from said base that is oriented so as to reflect to said first sensor sunlight approaching said tracker at an angle greater than 90° with respect to said reflective face, and means responsive to a magnitude of illumination of said first sensor that is greater than the magnitude of illumination of said second sensor for moving said base toward a position at which said plate points toward the sun, said base moving means being deactiveated when said sensors are substantially equally illuminated.

8. A suntracker according to claim 7 wherein said plate includes on said reflective face a plurality of convex irregular reflective surface portions, last said surface portions constituting said reflective surface portion.

9. A suntracker according to claim 7 wherein said plate includes at an end remote from said base a curvilinear portion formed so that a portion of said reflective face is a concave portion, said concave portion constituting said reflective surface portion.

* * * * *